J. H. L. JOHNSON.
METHOD OF STEAMING TOBACCO BEDS.
APPLICATION FILED MAY 10, 1911.

1,021,530.

Patented Mar. 26, 1912.
2 SHEETS—SHEET 1.

J. H. L. JOHNSON.
METHOD OF STEAMING TOBACCO BEDS.
APPLICATION FILED MAY 10, 1911.

1,021,530.

Patented Mar. 26, 1912.

2 SHEETS—SHEET 2.

Inventor
J. H. L. Johnson.

Witnesses

UNITED STATES PATENT OFFICE.

JOHN H. L. JOHNSON, OF SPRINGFIELD, TENNESSEE, ASSIGNOR TO SPRINGFIELD PLANT-BED STEAMING COMPANY, OF SPRINGFIELD, TENNESSEE.

METHOD OF STEAMING TOBACCO-BEDS.

1,021,530.  Specification of Letters Patent.  Patented Mar. 26, 1912.

Application filed May 10, 1911. Serial No. 626,323.

*To all whom it may concern:*

Be it known that I, JOHN H. L. JOHNSON, citizen of the United States, residing at Springfield, in the county of Robertson and State of Tennessee, have invented certain new and useful Improvements in Methods of Steaming Tobacco-Beds, of which the following is a specification.

This invention relates to an improved method of steaming tobacco beds for the purpose of sterilizing the soil and destroying noxious weeds and other foreign vegetation and animal life, preparatory to planting the tobacco crops.

Heretofore, it has been proposed to sterilize soil, prior to planting, by placing a shallow perforated pan containing a steam pipe, on the surface of hard or untilled ground and subsequently shoveling loose soil over the pan to form a mound, the steam from the pipe being discharged upwardly through the soil covering the pan to effect the sterilization of the soil. Such a method is objectionable in that the loose earth tends to clog the perforations in the steam pipe and prevent the discharge of steam and also by reason of the fact that the steam only passes through the soil in one direction. Moreover, as the pan must be banked or covered with earth each time the soil is sterilized, it necessarily follows that considerable labor is involved which renders the treatment of the soil, in this manner, objectionable. It has also been proposed to sterilize the soil by embedding a foraminated pan or box beneath the surface of the ground and forcing steam upwardly through the soil to the surface thereof. This method is also objectionable in that the pan must be embedded or buried in the ground before the steam can act on the soil and also by reason of the fact that the steam, after passing through the soil to the surface thereof, is allowed to escape and is thus wasted.

The present method of treating soil contemplates the employment of an open bottom hood or casing adapted to rest directly on the upper surface of previously prepared or tilled ground, steam being admitted to the hood, at sufficient pressure to cause the steam to pass downwardly through the loose surface soil and in contact with the subjacent hard stratum of earth so as to thoroughly sterilize said loose soil.

Figure 1:
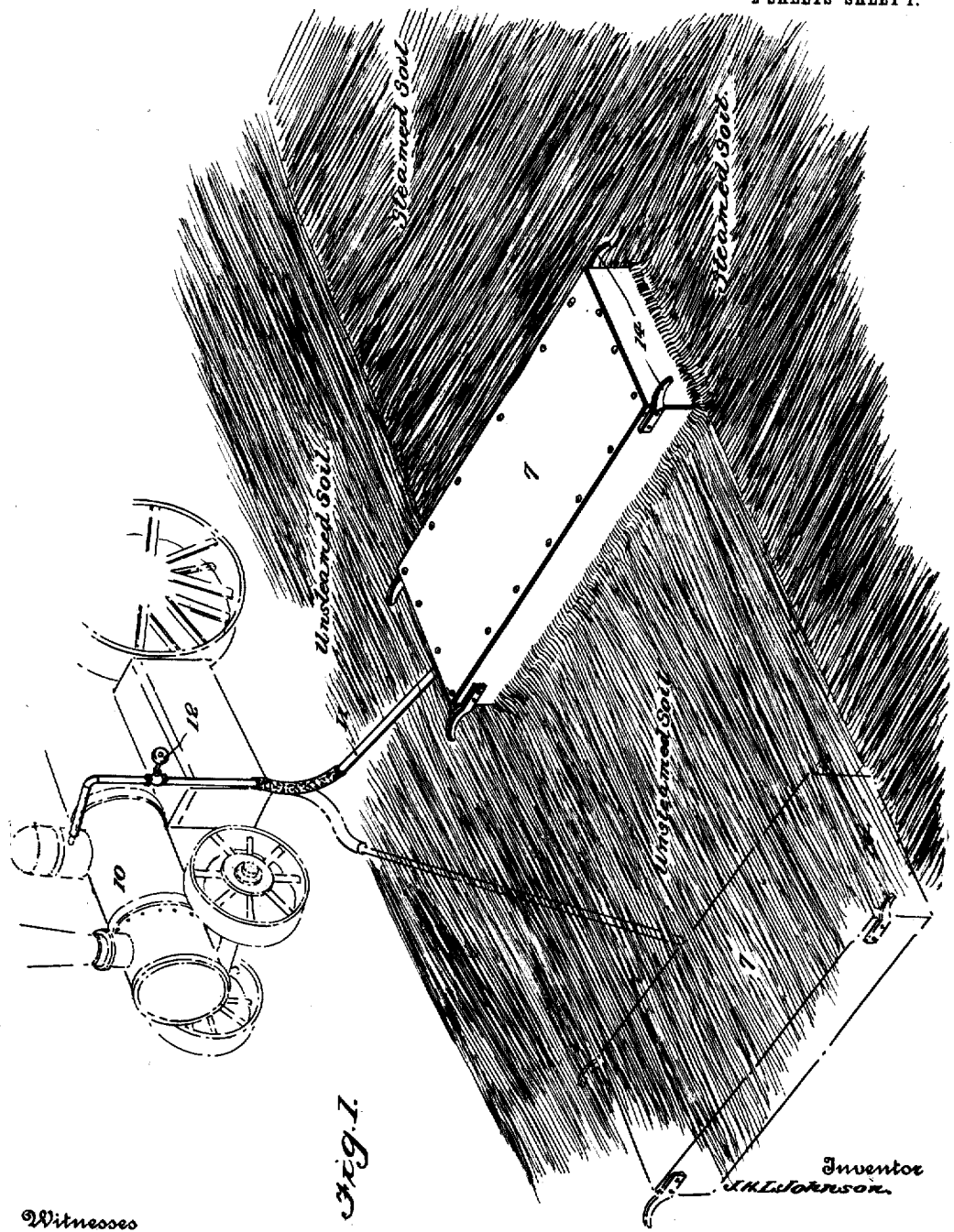
Figure 2:
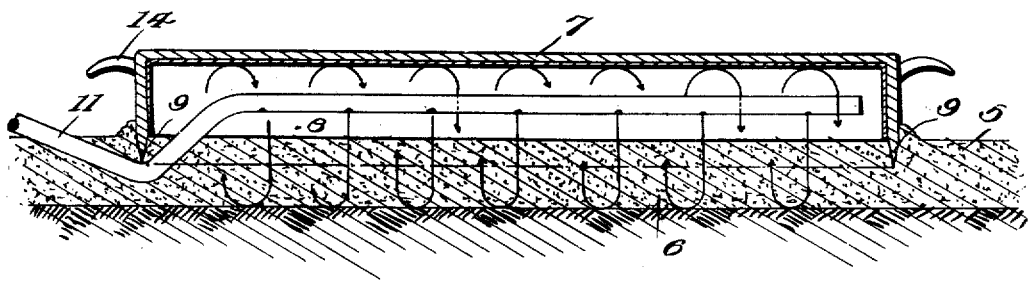
Figure 3:
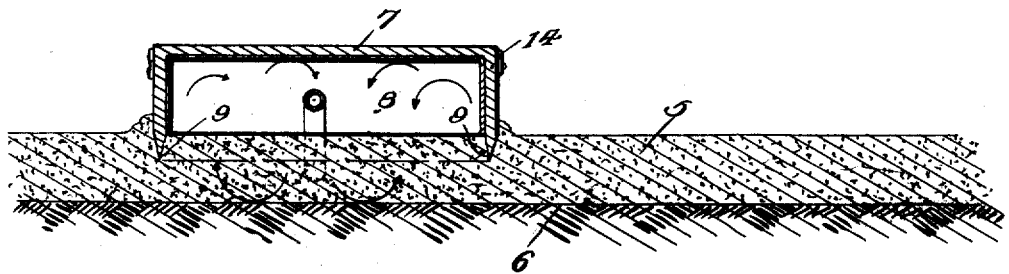

In the accompanying drawing, Figure 1 is a perspective view of one form of apparatus for carrying out the present invention; Fig. 2 is a vertical sectional view of the steaming hood; Fig. 3 is a transverse sectional view.

In carrying the present method into effect, the surface of the tobacco bed, to be treated or sterilized, is first thoroughly cleaned so as to remove stones, twigs and other foreign particles, after which the ground is prepared for planting by plowing and pulverizing the soil, thereby to obtain a surface stratum 5 of relatively loose light soil, through which steam may be forced, and a harder substratum 6, of clay or the like, which acts as an abutment or barrier to the passage of the steam and causes the latter, when coming in contact therewith, to be deflected upwardly through the soil 5 to the surface thereof. The steam is confined within a hood or casing 7 having an open bottom 8 and a marginal cutting edge 9 adapted to be pressed into the upper surface of the loose stratum 5, a small quantity of earth being subsequently banked around the cutting edge of the hood in order to prevent the escape of steam when treating the tobacco bed. Steam is conducted from a boiler or generator 10 of any suitable construction, through the medium of a pipe 11 to the interior of the hood or casing 7, it being preferred to pass the perforated discharge end of the pipe beneath the cutting edge of the hood, as shown, although, if desired, the pipe 11 may enter the hood from the top, sides or ends thereof with equally good results. A valve 12 is preferably connected in the pipe or conductor 11 near the boiler for the purpose of controlling the flow of steam from the boiler to said casing. It is to be understood that the hood or casing 7 is steam tight, so that the fluid cannot escape and consequently will be forced downwardly through the surface soil 5. The hood 7 is preferably provided with oppositely disposed handles 14 for convenience in lifting said hood when transferring the same from one plat to another. If desired, an auxiliary heat retaining hood or casing may be positioned over the ground, after the steaming hood is removed, and left thereon for a period ranging from twenty-five to thirty minutes so as to confine the heat within the ground and prevent premature chilling of the latter, especially in cold or windy weather.

In preparing a tobacco bed for seed planting, the ground is first treated in the manner described, after which the bent portion of the discharge end of the pipe 11 is forced into the loose surface soil and the steaming hood or casing 7 placed directly on the surface of the ground to be treated, a slight downward pressure being exerted on the top of the hood or casing so as to press the cutting edge thereof into the ground and a small quantity of loose earth banked around said cutting edge to prevent the escape of steam. Steam at sufficient pressure is then admitted to the hood or casing by opening the valve 12 and said steam allowed to discharge into the hood for a period ranging from twenty-five to thirty minutes. As the steam passes downwardly through the surface soil 5, the fluid will come in contact with the hard subjacent stratum 6, and as it cannot further penetrate the soil, said steam will be deflected upwardly through the surface soil and within the hood, which latter serves to confine the steam over the area being treated, a small portion of the steam escaping around the cutting edge of the hood, as shown, thus in effect subjecting the surface soil to a continuous circulation of steam flowing in opposite directions. If it is desired to retain the heat within the ground for a longer period, the fluid pipe or conductor is swung laterally and the hood 7 removed and placed over another portion or plat of the bed, the plat or portion of ground previously subjected to the action of the steam, being covered by the auxiliary hood, before referred to, which latter is allowed to stay in position thereon from twenty-five to thirty minutes so as to exterminate germs and noxious seeds and plants of all description, this operation being continued until the entire surface of a tobacco bed is sterilized.

If desired, the tobacco bed may be covered with manure or fertilizer prior to placing the steaming hood in position on the bed, and in which event, the seeds of clover, grass and weeds in the manure will be effectually destroyed. The steam, however, does not destroy the fertilizing qualities in the manure in any way, but on the contrary gives the plants a good growth and keeps the soil loose and warm so as to cause the plants to mature approximately from six to eight days earlier than when the soil is treated by surface burning and other methods.

It has been demonstrated by actual experiment that a predetermined area of the surface soil of a tobacco bed, treated in accordance with this method, may be thoroughly sterilized in from twenty-five to thirty minutes, this being due to the fact that the steam is free to circulate in opposite directions through the surface soil, as before stated. After the surface soil of the tobacco bed has been treated in the manner described, the earth is allowed to cool for a period ranging from twelve to twenty-four hours, when the soil is in condition for planting.

Having thus described the invention, what is claimed as new is:

1. The herein described method of treating soil, which consists in first preparing the soil to obtain a loose surface stratum, forcing steam downwardly through the surface soil and in contact with the subjacent hard stratum of earth, and subsequently covering the soil thus treated to retain the heat therein.

2. The herein described method of treating the soil of tobacco beds, which consists in first preparing the soil by tilling the same to obtain a loose surface stratum, forcing steam downwardly through the surface soil and in contact with the subjacent hard stratum of earth, cutting off the steam supply, covering the soil previously subjected to the action of steam, and subsequently removing the covering means and allowing the soil to cool.

In testimony whereof, I affix my signature in presence of two witnesses.

JOHN H. L. JOHNSON. [L. S.]

Witnesses:
J. W. BELL,
W. D. SUGG.